US010006293B1

(12) United States Patent
Jones

(10) Patent No.: US 10,006,293 B1
(45) Date of Patent: Jun. 26, 2018

(54) APPARATUS AND PROCESS FOR REFINING FEATURES IN AN ADDITIVE MANUFACTURED PART

(71) Applicant: Russell B Jones, North Palm Beach, FL (US)

(72) Inventor: Russell B Jones, North Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 329 days.

(21) Appl. No.: 14/805,918

(22) Filed: Jul. 22, 2015

(51) Int. Cl.
| | |
|---|---|
| F01D 5/18 | (2006.01) |
| B22F 5/04 | (2006.01) |
| B22F 7/08 | (2006.01) |
| B22F 3/105 | (2006.01) |
| F01D 25/12 | (2006.01) |
| B23P 15/02 | (2006.01) |
| B23K 15/00 | (2006.01) |
| B33Y 80/00 | (2015.01) |
| B33Y 10/00 | (2015.01) |
| F01D 5/00 | (2006.01) |

(52) U.S. Cl.
CPC ............ *F01D 5/186* (2013.01); *B22F 3/1055* (2013.01); *B22F 5/04* (2013.01); *B22F 7/08* (2013.01); *B23K 15/0086* (2013.01); *B23P 15/02* (2013.01); *F01D 25/12* (2013.01); *B33Y 10/00* (2014.12); *B33Y 80/00* (2014.12); *F01D 5/005* (2013.01); *F05D 2220/32* (2013.01); *F05D 2230/22* (2013.01); *F05D 2230/233* (2013.01); *F05D 2230/237* (2013.01); *F05D 2260/202* (2013.01)

(58) Field of Classification Search
CPC ..... B23K 15/0086; F01D 5/005; F01D 5/186; B22F 7/08; B22F 3/008; B22F 3/1055; B22F 3/24; B22D 19/10; B23P 6/007; B23P 6/002; F05D 2230/20; F05D 2230/22; F05D 2230/30; F05D 2230/31; F05D 2230/312; F05D 2230/313; F05D 2230/314; F05D 2230/80; F05D 2260/202; B28B 1/001; B29C 67/0077; Y10T 29/49341
USPC ................................ 29/402.18; 228/126, 132
See application file for complete search history.

(56) References Cited

U.S. PATENT DOCUMENTS

| | | | | |
|---|---|---|---|---|
| 3,576,065 A | * | 4/1971 | Frazier ................ | B23K 9/0026 29/402.18 |
| 4,726,104 A | * | 2/1988 | Foster ................ | B23K 35/224 228/118 |

(Continued)

FOREIGN PATENT DOCUMENTS

| | | | | |
|---|---|---|---|---|
| JP | 2003206748 A | * | 7/2003 | ............. B23P 6/007 |
| JP | 5341457 B2 | * | 11/2013 | ............. B23P 6/007 |
| WO | WO 2004022266 A1 | * | 3/2004 | ............. B22D 19/10 |

*Primary Examiner* — Ninh H Nguyen
*Assistant Examiner* — Topaz L Elliott
(74) *Attorney, Agent, or Firm* — John Ryznic

(57) ABSTRACT

A part formed using an metal additive manufacturing process such as a turbine airfoil with an oversized feature such as an oversized hole, where the oversized hole is filled with a preform having a shape of a normal sized hole and secured within the part using a braze or weld material, and where the preform is removed to leave within the part the normal sized hole. The preform is made of a refractory material that can be removed from the part by exposure to oxygen.

18 Claims, 3 Drawing Sheets

(56) References Cited

U.S. PATENT DOCUMENTS

| | | | |
|---|---|---|---|
| 5,511,721 A * | 4/1996 | Demo | B23K 3/087 |
| | | | 228/119 |
| 6,265,022 B1 * | 7/2001 | Fernihough | F01D 5/28 |
| | | | 29/889.1 |
| 6,742,698 B2 * | 6/2004 | Shah | B23K 9/044 |
| | | | 228/119 |
| 7,240,414 B2 * | 7/2007 | Taylor, Sr. | A61F 2/5046 |
| | | | 264/222 |
| 7,552,855 B2 * | 6/2009 | Vargas | B23K 33/004 |
| | | | 228/119 |
| 7,841,083 B2 | 11/2010 | Alaux et al. | |
| 8,020,296 B2 | 9/2011 | Guemmer et al. | |
| 8,153,923 B2 | 4/2012 | Beck et al. | |
| 8,704,128 B2 | 4/2014 | Beck et al. | |
| 9,003,657 B2 | 4/2015 | Bunker et al. | |
| 2010/0161076 A1 * | 6/2010 | Pallari | A61F 2/5046 |
| | | | 623/36 |
| 2010/0239409 A1 * | 9/2010 | Draper | F01D 5/005 |
| | | | 415/1 |
| 2013/0071562 A1 * | 3/2013 | Szuromi | B22F 3/1055 |
| | | | 427/237 |
| 2015/0140239 A1 * | 5/2015 | Reid | B23K 9/044 |
| | | | 428/34.1 |
| 2016/0052057 A1 * | 2/2016 | Xu | F01D 5/187 |
| | | | 419/5 |
| 2016/0089859 A1 * | 3/2016 | Lacy | B32B 15/01 |
| | | | 428/596 |

\* cited by examiner

APPARATUS AND PROCESS FOR REFINING FEATURES IN AN ADDITIVE MANUFACTURED PART

Apparatus and process for refining features in an additive manufactured part.

CROSS-REFERENCE TO RELATED APPLICATIONS

None.

GOVERNMENT LICENSE RIGHTS

None.

BACKGROUND OF THE INVENTION

Field of the Invention

The present invention relates generally to additive manufactured metal parts, and more specifically to a turbine airfoil formed by a metal additive manufacturing process with a film cooling hole.

Description of the Related Art Including Information Disclosed Under 37 CFR 1.97 and 1.98

In a gas turbine engine, airfoils exposed to the highest gas stream flow must be cooled to prevent damage. Turbine airfoils that require cooling air flow are typically formed using an investment casting process with a ceramic core that represents the internal cooling features. The size and shape of these internal features are limited to the strength of the ceramic material that forms the core. During the casting process, liquid metal is poured into a mold that secures the ceramic core. Small features on the ceramic core can easily break due to the heavy liquid metal passing through. Casting yields for complex airfoil internal cooling features can be quite high, and thus the cost to produce these airfoils are therefore relatively expensive.

The new metal additive manufacturing process is being used to form complex parts such as turbine airfoils with internal cooling features where the entire part is printed by a metal printing process such as direct metal laser sintering or DLMS. However, small features such as film cooling holes that are printed are formed with a very large tolerance. The degree of accuracy to resolve holes and features is limited by the size of the laser melt pool, the size of the powder particles, and the geometry being formed. Defects in passages can cause restrictions in flow or surface stress concentrations that will limit the part life. In the case of a relatively small film cooling hole, additive manufactured holes can have surface defects that create roughness or blockage that restrict the flow and create additional pressure drop. FIG. 1 shows a side view of a small film cooling hole printed using the metal additive manufacturing process of the prior art. FIG. 2 shows a front view of the printed film cooling hole of FIG. 1 with a wide variation in tolerance or relatively large surface defects.

BRIEF SUMMARY OF THE INVENTION

A part such as an air cooled turbine airfoil with a film cooling hole, where the part is formed by a metal additive manufacturing process with an oversized feature such as a hole, and where the oversized feature is formed with a normal size by inserting a preform having the normal size to the part and secured to the part, and where the preform is removed such that the normal size feature is left in the part.

The part can be an air cooled turbine airfoil and the feature is a film cooling hole. The airfoil is formed from the metal additive manufacturing process with an oversized hole. A preform made from a refractory material is secured in the oversized hole using a braze or weld material that also fills the gap between the oversized hole and the preform. The preform has a shape of the normal size film cooling hole. The refractory alloy preform is removed, such as by exposure to oxygen at temperatures where the refractory alloy sublimates, and the normal sized film cooling hole is thus formed in the wall.

The hole can be a spiral or helical shaped hole, a curved hole, a hole with a diffusion opening, a slot for a seal, and even a threaded hole for a fastener.

DETAILED DESCRIPTION OF THE INVENTION

Figure 1:
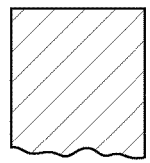
FIG. 1 shows a cross section side view of a film cooling hole formed using a metal additive manufacturing process of the prior art.
Figure 1:
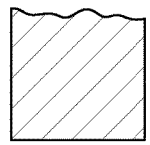
Figure 2:
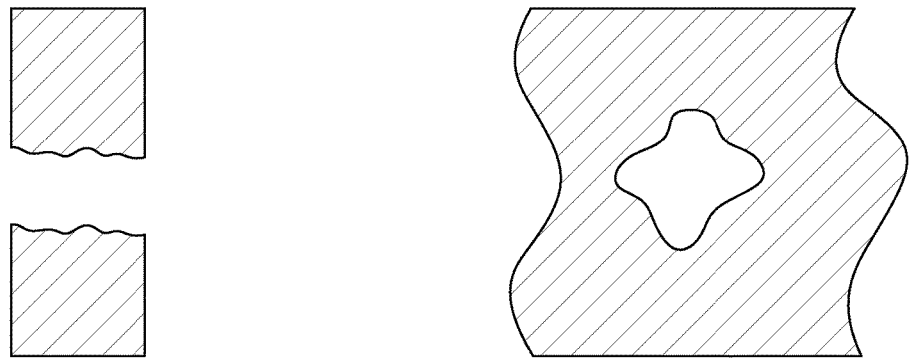
FIG. 2 shows a front view of the printed film cooling hole of FIG. 1 with a large variation in the hole surface.

The present invention is an apparatus and a process to form a metal additive manufactured (printed) part with a feature having a detail that cannot be formed by the metal printing process alone. FIGS. 1 and 2 shows a part with a hole such as that in a turbine airfoil having a film cooling air hole in which the part and the hole are formed as a single piece using the metal printing process. The hole varies widely in the tolerance and surface finish due to limitations in the metal additive manufacturing process. With the metal printing process of the present invention, the features such as the film cooling hole can be formed with fine details like that produced in the prior art metal casting process. Defects such as splatter can adhere unwanted particles to the desired printed geometry such as a smooth wall surface or hole.

Figure 3:
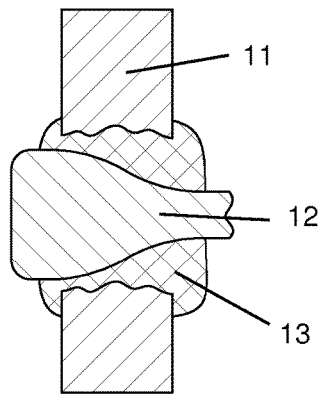
FIG. 3 shows a cross section side view of a film cooling hole formed using the metal additive manufacturing process of the present invention with a refractory alloy hole replica in place.
Figure 4:
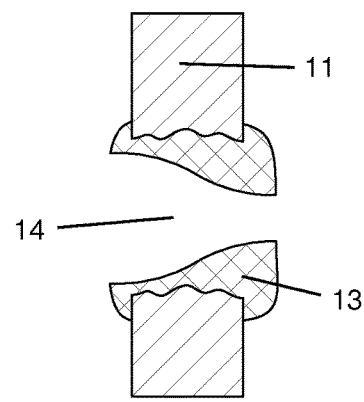
FIG. 4 shows a cross section side view of the film cooling hole of the present invention with the refractory hole replica removed.

FIG. 3 shows a first embodiment of the present invention in which a film cooling hole is formed in a part such as a turbine airfoil wall. The part in which the hole is to be formed can be cast or printed in which the hole is formed oversized. In FIG. 3, the wall 11 is formed with an oversized hole. A preform 12 having a finished shape of the feature to be formed such as in this case the film cooling hole is secured in place within the oversized hole such as by a braze or a weld material 13. The preform 12 is formed from a refractory material that can be easily removed after the braze or weld material 13 has been formed around the preform 12. The braze or welding would be performed in a reducing gas (reactive gas that removes free oxygen), an inert gas or vacuum environment as to prevent the oxidation of the refractory alloy. The refractory material can be alloys of Molybdenum, tungsten, niobium, or other materials that can be easily removed such as by sublimation to leave the desired shaped hole. The material can have non-refractory material, but the object of the preform material is that it can be substantially all removed by rapid oxidation/sublimation at moderate elevated temperatures so that a refined hole is left in the part of wall without any surface defects like those found in the metal additive manufacturing process alone. FIG. 4 shows the braze or weld material 13 removed and the resulting finished film cooling hole 14 formed within the airfoil wall 11. The film cooling hole 14 has a much lower tolerance than the prior art film cooling hole of FIGS. 1 and 2 because of the use of the preform 12.

Figure 5:
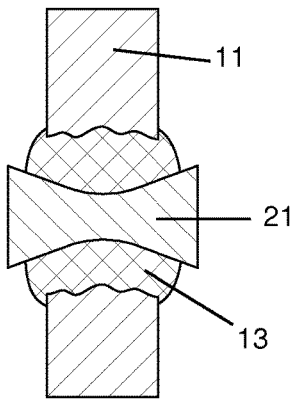
FIG. 5 shows an embodiment of the present invention in which a double conical shaped preform is used.

FIG. 5 shows an embodiment of the present invention where a double conical shaped hole can be formed using a preform 21 having this finished shape that is secured into the oversized hole by a braze or weld material 13 formed in the wall or part 11 using the prior art casting or metal printing process.

Figure 6:
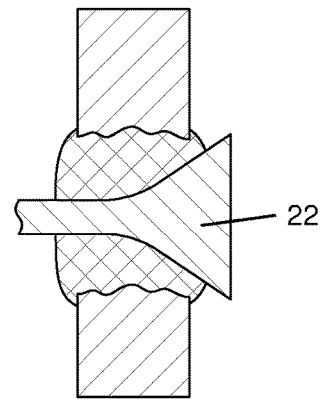
FIG. 6 shows an embodiment of the present invention in which a diffusion hole shaped preform is used.

FIG. 6 shows an embodiment of the present invention where the hole formed has a diffusion cooling hole shape 22.

Figure 7:
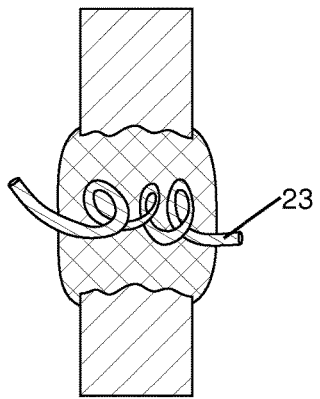
FIG. 7 shows an embodiment of the present invention in which a helical shaped preform is used.

FIG. 7 shows an embodiment of the present invention where the hole formed has a helical cooling hole shape 23.

Figure 8:
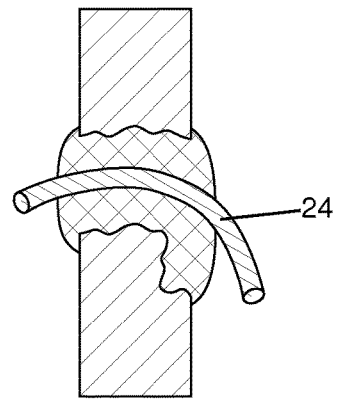
FIG. 8 shows an embodiment of the present invention in which a curved shaped preform is used.

FIG. 8 shows an embodiment of the present invention where the hole formed has a curved cooling hole shape 24.

Figure 9:
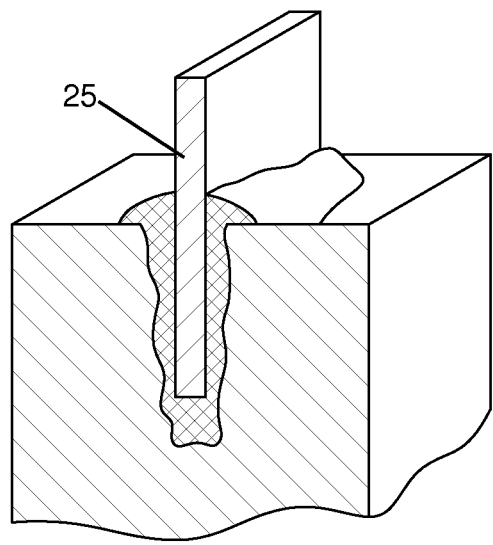
FIG. 9 shows an embodiment of the present invention in which a slot shaped preform is used.

FIG. 9 shows an embodiment of the present invention where the hole formed has a slot shape 25 such as a slot for a seal to be inserted.

Figure 10:
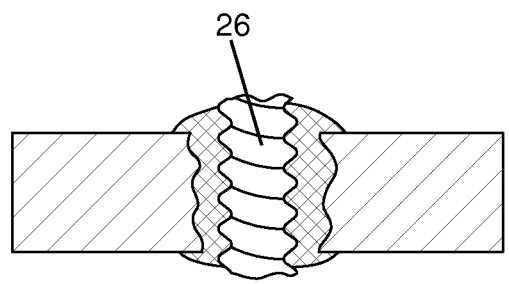
FIG. 10 shows an embodiment of the present invention in which a threaded shaped preform is used.

FIG. 10 shows an embodiment of the present invention where the hole formed has a threaded shape 26 such as a thread in which a screw or bolt can be inserted.

The apparatus and process of the present invention utilizes an additive manufactured part created with an oversized hole in which a refractory material having a desired finished shape is inserted and the gap filled by welding or braze filler material. In one embodiment of the present invention, the braze alloy is used to create the refined hole feature. A refractory material sized to the desired shape of the final hole is inserted into the oversized hole in the part and the gap filled with the braze alloy or weld material. In another embodiment, the refractory hole preform could have the braze alloy pre-applied to the replica or preform before it is inserted into the part.

The brazing thermal cycle would be performed in an insert gas environment, vacuum, or reducing gas environment, each to prevent the oxidation of the refractory alloy. Post braze, the braze furnace could be backfilled with air to allow the refractory alloy to oxidize (sublimate) leaving the clear hole as the result interface of the removed refractory and the braze filler.

The apparatus and process of the present invention can be used to produce a variety of features such as slots, channels, recesses, cooling holes, or other features that cannot be printed with the desired low tolerance. The surface finish within the final refined part with the hole refinement process applied would be reflective or the initial refractory form.

Features such as tapered cooling holes, could be produced to allow for acceleration, diffusion, or metering of the cooling air flow through the axial length of the hole. Curved holes or helical shaped holes can also be produced with the high tolerance finish.

The apparatus and process of the present invention is applicable to additive manufactured parts and additionally to conventional manufactured parts such as machined from bar or plate stock, casting (investment cast, sand cast, centrifugal cast), and machined forgings. A part can be formed unfinished using a casting process (for example) and then finished using the metal printing process with the preform of the present invention. Refurbishment of the parts such as gas turbine parts, hot gas path parts, blades, vanes, heat shields could be restored and improved by the use of this process. Features could include slots, holes, threads, and recesses.

The preform can be made from a ceramic material instead of a refractory material, and where the ceramic preform can be removed by chemical leaching to produce the desired feature such as a hole. In this embodiment, an oversized feature such as a hole is still formed, but the preform is not a refractory material but a ceramic material.

I claim the following:

1. A process for forming a hole in a part formed by a metal additive manufacturing process comprising the steps of:
    forming a part with an oversized hole using a metal additive manufacturing process;
    inserting a preform having a shape of a normal sized hole into the oversized hole of the part;
    securing the preform in the oversized hole with a material that fills a gap between the oversized hole and the preform; and,
    removing the preform so that a normal sized hole is formed in the part.

2. The process for forming a hole in a part of claim 1, wherein:
    the part is a turbine airfoil; and,
    the normal sized hole is a film cooling hole.

3. The process for forming a hole in a part of claim 1, wherein:
    the preform is formed of a refractory material that can be removed by exposure to oxygen.

4. The process for forming a hole in a part of claim 1, and further comprising the step of:
    securing the preform to the oversized hole with a braze material or a weld material.

5. The process for forming a hole in a part of claim 1, wherein:
    the normal sized hole is a helical shaped hole, or a curved hole, or a slot for a seal, or a threaded hole for a fastener.

6. The process for forming a hole in a part of claim 1, wherein:
    the part is a turbine airfoil; and,
    the normal sized hole is a film cooling hole with a diffusion opening.

7. The process for forming a hole in a part of claim 1, wherein:
    the metal additive manufacturing process is a direct metal laser sintering process or an electron beam melting process.

8. The process for forming a hole in a part of claim 1, wherein:
    the preform is formed substantially from Molybdenum or Tungsten or Niobium.

9. An air cooled turbine airfoil comprising an airfoil with a plurality of film cooling holes, wherein the plurality of film cooling holes are made by the process of claim 1.

10. A part formed by a metal additive manufacturing process with a hole having surface with a low tolerance that cannot be formed from the metal additive manufacturing process by itself, the part comprising:
a wall having an oversized hole formed from a metal additive manufacturing process;
a preform having a shape of a normal sized hole;
the preform being formed from a refractory material that can be removed by exposure to oxygen;
a braze material or a weld material filling a gap between the oversized hole and the preform to secure the preform to the oversized hole; and,
wherein exposure of the preform to oxygen will remove the preform from the oversized hole and leave a normal sized hole within the wall.

11. The part formed by a metal additive manufacturing process of claim 10, wherein the preform has been removed by exposure to oxygen.

12. The part formed by a metal additive manufacturing process of claim 10, wherein:
after exposure of the preform to oxygen such that the preform is removed,
the part is an air cooled turbine airfoil; and,
the hole is a film cooling hole.

13. The part formed by a metal additive manufacturing process of claim 10, wherein:
the normal sized hole is a helical shaped hole, or a curved hole, or a slot for a seal, or a threaded hole for a fastener.

14. The part formed by a metal additive manufacturing process of claim 10, wherein:
the preform is formed substantially from Molybdenum or Tungsten or Niobium.

15. The part formed by a metal additive manufacturing process of claim 12, wherein: the film cooling hole has a diffusion opening.

16. A process of forming an air cooled turbine airfoil from a metal additive manufacturing process comprising the steps of:
forming an air cooled turbine airfoil with a plurality of film cooling holes from an additive manufacturing process in which the film cooling holes are formed oversized;
inserting a preform having a shape of a non-oversized film cooling hole into each of the oversized film cooling holes;
securing the preforms to the oversized film cooling holes with a material having a melting temperature of at least as high as the material of which the air cooled turbine airfoil is made from; and,
removing the preforms to leave non-oversized film cooling holes in the air cooled turbine airfoil.

17. The process of forming an air cooled turbine airfoil from a metal additive manufacturing process of claim 16, and further comprising the step of:
securing the preform to the oversized hole with a braze material or a weld material.

18. The process of forming an air cooled turbine airfoil from a metal additive manufacturing process of claim 16, wherein:
the preform is formed of a refractory material that can be removed by exposure to oxygen.

* * * * *